US006891943B1

(12) United States Patent
Liebl

(10) Patent No.: US 6,891,943 B1
(45) Date of Patent: May 10, 2005

(54) METHOD AND DEVICE FOR ESTABLISHING CONNECTION PATH IN A COMMUNICATIONS NETWORK

(75) Inventor: Robert Liebl, Lohberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/582,120

(22) PCT Filed: Dec. 29, 1998

(86) PCT No.: PCT/DE98/03813

§ 371 (c)(1),
(2), (4) Date: Jun. 22, 2000

(87) PCT Pub. No.: WO99/38340

PCT Pub. Date: Jul. 29, 1999

(30) Foreign Application Priority Data

Jan. 23, 1998 (DE) .......................... 198 02 599

(51) Int. Cl.[7] .............................................. H04M 7/00
(52) U.S. Cl. .................................... 379/219; 379/220.1
(58) Field of Search ........................... 379/219, 220.01, 379/221.01, 221.02

(56) References Cited

U.S. PATENT DOCUMENTS

| 3,536,842 | A |   | 10/1970 | Ewin et al. ................ 379/197 |
| 4,669,113 | A | * | 5/1987  | Ash et al. ................ 379/221.01 |
| 4,862,496 | A |   | 8/1989  | Kelly et al. ............. 379/221.01 |
| 5,491,690 | A |   | 2/1996  | Alfonsi et al. .............. 370/404 |
| 5,926,456 | A |   | 7/1999  | Takano et al. .............. 370/218 |
| 6,002,688 | A |   | 12/1999 | Song ....................... 370/395.3 |
| 6,389,128 | B1 | * | 5/2002 | Stademann ............ 379/221.01 |

FOREIGN PATENT DOCUMENTS

| DE | 195 31 609 | 3/1996 |
| EP | 0 538 853 | 4/1993 |
| EP | 0 696 147 | 8/1994 |
| WO | WO 93/08666 | 4/1993 |

OTHER PUBLICATIONS

Microsoft Press Computer Dictionary Third Edition, 1997, Microsoft Press, p. 72.*
Flexible Netze—688 NTZ Nachrichten Technische Zeitschrift 44 (1991) Oct., No. 10, Berlin, DE—Dynamische nichthierarchische Verkehrslenkung.
2323 Telcom Report (Siemens) 18 (1995) Sep./Oct. No. 5, Munchen, DE—Auf Alternativwegen zu mehr Gewinn.
International Telecommunication Union, ITU–T Recommendation Q.2764 (1995).
Stademann, R., "Optimized Dynamic Routing (ODR) bring Betreibern nichthierarchischer Netze beachtliche wirschaftlische Vorteile", 2323 Telecom Report (Siemens), 18(5):244–247 (1995) [Abstract].

* cited by examiner

Primary Examiner—Ahmad F. Matar
Assistant Examiner—Quynh H. Nguyen
(74) Attorney, Agent, or Firm—Fish & Richardson P.C.

(57) ABSTRACT

In a method for determining a suitable connecting path in a communication network as well as to a corresponding switching equipment, given the presence of a connection inquiry to a requested destination node, a check is first carried out to see whether a suitable connecting path to the requested destination node is already stored in a corresponding dynamic memory. When this is not the case, a suitable connecting path is determined on the basis of stored network data of the communication network and is subsequently entered in the dynamic memory, so that this connecting path is subsequently available for further connecting path determinations. After determining a suitable connecting path, the connection to the requested destination node is set up according to the determined connecting path.

20 Claims, 3 Drawing Sheets

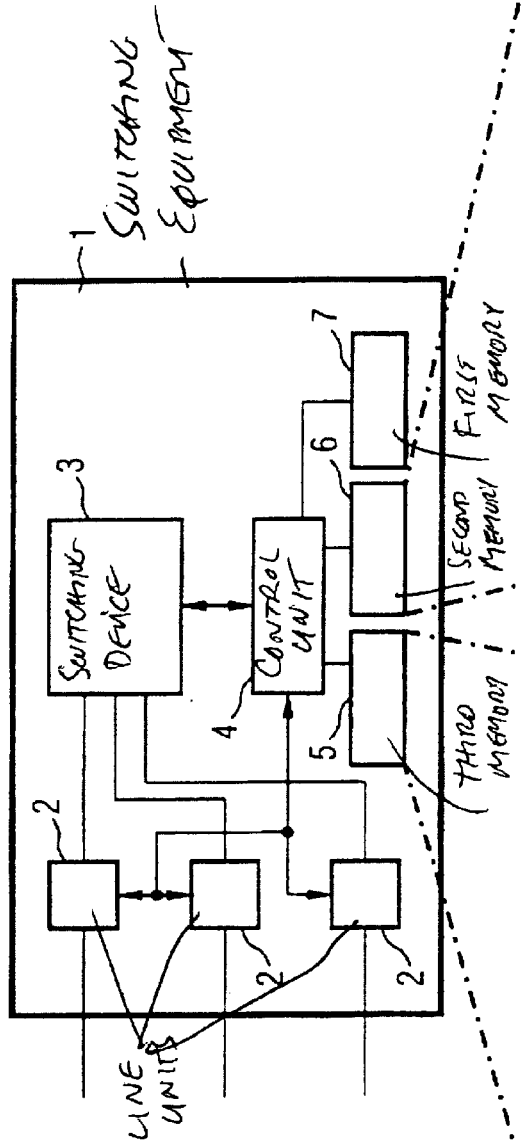
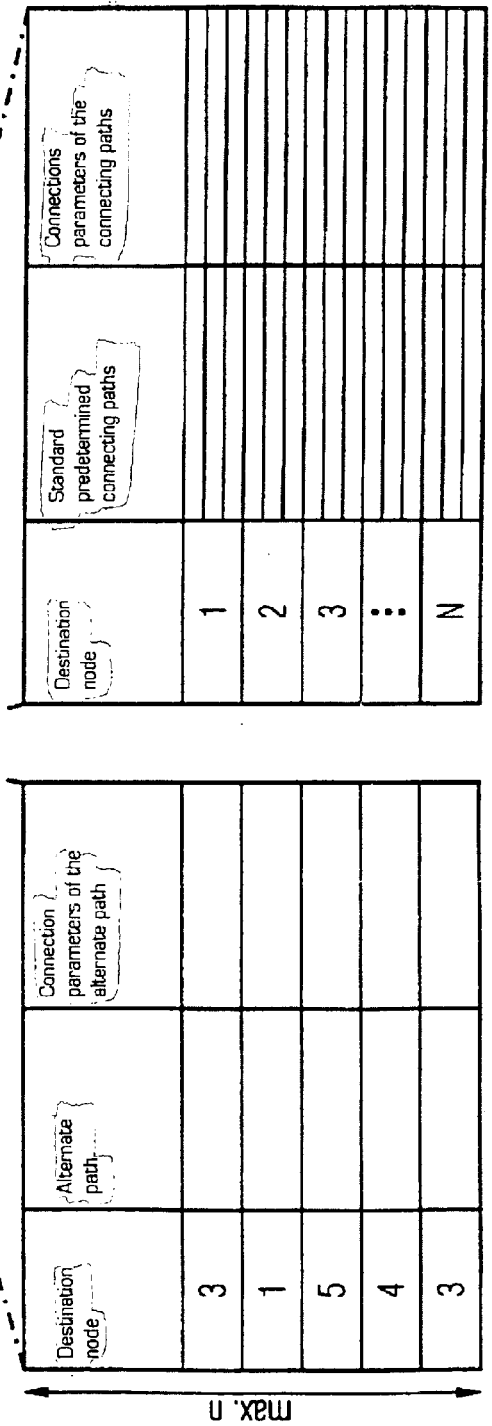
FIG 1

METHOD AND DEVICE FOR ESTABLISHING CONNECTION PATH IN A COMMUNICATIONS NETWORK

BACKGROUND OF THE INVENTION

The present invention is directed to a method for determining a connecting path in a communication network as well as to a corresponding switching equipment for use in communication networks, particularly in communication networks having hierarchically, complete determination of connecting paths.

As is known, communication networks are composed of a plurality of network or switching nodes that are connected to one another according to a specific network topology. Subscriber terminal equipment can be connected to some of these network nodes as user-specific line units of a communication network, whereas other network nodes serve only as transfer nodes, i.e. for forwarding communication information.

By way of example, FIG. 3a shows the structure of a binary-like communication network structure. According to FIG. 3a, the network shown by way of example comprises a total of ten network nodes $K_1$–$K_{10}$. A plurality of subscriber terminal equipment $EG_{11}$–$EG_{43}$ are respectively connected to the network nodes $K_1$–$K_4$. These network nodes $K_1$–$K_4$ form the lowest hierarchy level of the communication network shown in FIG. 3a and are referred to as local network nodes. The local network nodes $K_1$–$K_4$ are connected to one another with corresponding connecting paths via the other network nodes $K_5$–$K_{10}$. According to the example shown in FIG. 3a, no subscriber terminal equipment are connected to the network nodes $K_5$–$K_{10}$, so that these network nodes serve only as transfer or switching nodes. The network nodes $K_5$–$K_7$ correspond to regional network nodes and serve the purpose of connecting the local network nodes $K_{1\ and\ K2}$, $K_2$ and $K_3$ or, respectively, $K_3$ and $K_4$. Correspondingly, the network nodes $K_8$ and $K_9$ serve for connecting the regional network nodes $K_5$ and $K_6$ or, respectively, $K_6$ and $K_7$ and are referred to as super-regional network nodes. Finally, the node central $K_{10}$ that connects the super-regional network nodes $K_8$ and $K_9$ to one another forms the highest hierarchy level of the communication system shown in FIG. 3a. When, for example, the subscriber $EG_{42}$ is called from the subscriber terminal equipment $EG_{12}$, a connecting path or, respectively, connecting route must be set up via the communication network proceeding from the local network node $K_1$ to the local destination network node $K_4$ of the called subscriber. There are thereby a number of connecting possibilities according to the communication network shown in FIG. 3a. One connection, for example, could lead via the network nodes $K_1$–$K_5$–$K_8$–$K_{10}$–$K_9$–$K_7$–$K_4$. Another connecting possibility would be the connecting path via the [. . . ] $K_1$–$K_5$–$K_2$–$K_6$–$K_3$–$K_7$–$K_4$, etc. The individual network nodes $K_1$–$K_{10}$ are formed by switching equipment whose jobs include determining the suitable connecting path from a calling terminal equipment to a called terminal equipment and setting up the corresponding connection.

Whereas FIG. 3a shows a tree-like communication network structure, FIG. 3b shows a cube-like communication network structure, whereby, in particular, respectively three network nodes $K_1$–$K_3$ form a network node group that is connected via corresponding connecting lines to a neighboring network node group that is likewise composed of three network nodes. Terminal equipment can be optionally connected to each of the network nodes shown in FIG. 3b or the corresponding network node can merely serve as a transfer node without terminal equipment connected thereto.

Due to the currently increasing need for digital communication networks with great bandwidths and high transmission rates, what is referred to as the ATM transmission principle (asynchronous transfer mode) has prevailed for data transmission in communication networks. According to this ATM transmission principle, the data to be transmitted are communicated in the form of what are referred to as ATM cells that are composed of a header and an information field. The header contains address or, control information of the corresponding ATM cell, whereas the information field comprises the actual payload information. The address information contained in the header are employed for the routing of the payload information within the communication network. The data transmission from one network node to another optically, i.e. via light waveguides.

In communication networks having hierarchically complete path determination, the network topology of the communication network is stored and, thus is known in the individual network nodes. Each network node or, the corresponding switching equipment of this network node is thus informed, for example, about how many and which other network nodes are present in the communication network, which connecting lines or, respectively, connecting paths exist between the individual network nodes and what transmission properties (for example, transmission capacities and transmission statusses) the corresponding connecting paths have. On principle, thus, every network node is in the position to determine a hierarchically complete connecting path to a desired destination node of the communication network. As a rule, the complete connecting path is defined by that network node to which the calling terminal equipment is connected (see the network nodes $K_1$–$K_4$ in FIG. 3a). After receiving the corresponding connection request (for example, to the terminal equipment $EG_{42}$ shown in FIG. 3a), the originating node determines the entire path through the communication network up to the desired destination node on the basis of the information about the communication network available to it. After defining the suitable connecting path, the originating node or, the switching equipment thereof generates an information element in which the individual network nodes to be traversed along the defined connecting path are defined. Additionally, the connecting lines (ports) can also already be defined in the information element. Together with a pointer, this information element is communicated to the individual network nodes participating in the defined connecting path, whereby the pointer respectively points to the next network node to be approached. When, for example, a connection is requested from the terminal equipment $EG_{12}$ shown in FIG. 3a to the terminal equipment $EG_{42}$ and when the originating node $K_1$ has selected the route $K_1$-$K_5$-$K_2$-$K_6$-$K_3$-$K_7$-$K_7$ [sic]–$K_4$ for this connection, the individual network nodes $K_5$, $K_2$, $K_6$$K_3$, $K_7$ and $K_4$ to be approached are successively deposited in the corresponding information element in the form of a stack memory, whereby the pointer of the information element points first to the network node $K_5$.

In order to keep the connection setup times relatively short, the connecting paths to every potential destination node of the communication network are determined in advance and stored in the individual network nodes. Due to the different quality demands (for example, bandwidth, delay, etc.) of a connection request or, of a connection inquiry and due to the increasing complexity of the communication networks, all possible connecting paths from an originating node to a destination node can usually not be calculated in advance and stored. First, there is thereby the risk of inadequate memory space; second, not all possible alternative paths are in fact usually made use of. Further, the time required for a connection setup lengthens if all possible alternative paths must be searched before the actual connection setup before the ultimately suited connecting path was capable of being found. When, on the other hand, all of the pre-calculated connecting paths fail to satisfy the demands of a connection request (for example, with respect to the bandwidth or transmission rate), a suitable connecting path must first be newly determined on the basis of the available network information. This can be a very time-intensive procedure dependent on the complexity of the communication network, as a result whereof the connection setup can be substantially delayed or, even jeopardized. As a compromise, only a specific plurality of standard connecting paths are therefore stored in each network node. For this purpose standard values are assumed for the individual connecting paths to each network node of the communication network with respect to the quality demands of the corresponding connection request, and, for example, only the respectively shortest path or paths to each potential destination node is/are calculated and stored. Given a pending connection request, all pre-calculated and stored connecting paths are then checked to see whether they meet the quality demands of the pending connection request. When one of the pre-calculated connecting paths meets the quality demands, this is employed for the connection setup to the requested destination node. When, however, none of the precalculated connecting paths meets the corresponding quality demands, a suitable alternative path to the requested destination node is determined on the basis of the stored network topology data and employed for the connection setup.

However, the above-described procedure has the disadvantage that, dependent on the pending connection request, it is still not possible to preclude relatively long connection setup times since only a relatively slight number of standard connecting paths is pre-calculated and stored, so that a suitable alternative path must potentially be determined first when none of these precalculated standard connecting paths can meet the quality demands of a requested connection, which can in part be very time-intensive dependent on the complexity of the communication network.

SUMMARY OF THE INVENTION

The present invention is therefore based on the object of creating an improved method for determining a connecting path in a communication network as well as switching equipment for communications network, whereby the time required for setting up a requested connection can be shortened.

According to the present invention, a method is provided for determining a connecting path in a communication network. In a first step, it is determined whether a suitable connecting path to a requested destination node of the communication network is already stored. In a second step, when in the first step a suitable stored connecting path has not yet been identified, determining a suitable connecting path to the requested destination node on the basis of stored network data that describe the communication network, and storing the connecting path so that it is available for a new determination of a connecting path in the first step. In a third step, communicating path information corresponding to the connecting path determined in the first or second steps to network nodes that are a component part of the determined connecting path in order to set up the determined connecting path to the requested destination node.

According to the present invention, a dynamic connecting path memory is established. When a connection request or, respectively, a connection inquiry pends, this connecting path memory is searched for a suitable connecting path to the requested destination node. When the stored connecting paths do not meet the demands of the connection request, a suitable alternative path to the requested destination node is determined on the basis of the stored network topology data and entered into the dynamic connecting path memory, whereby the connecting paths deposited in the dynamic connecting path memory remain stored in the corresponding switching equipment beyond the duration of the connection.

This dynamic connecting path memory can be alternatively or additionally present to the initially described memory with pre-calculated, standard connecting paths. When the dynamic connecting path memory is present in addition to the memory with pre-calculated, standard connecting paths, the memory with pre-calculated, standard connecting paths is searched first upon arrival of a connection inquiry for a suitable connecting path to the requested destination node that also meets the demands of the connection request. When all pre-calculated, standard connecting paths are unsuitable for the pending connection request, the connecting paths stored in the dynamic connecting path memory are searched in the next step. When, at this time, there is still no entry in the dynamic connecting path memory or, respectively, a suitable connecting path that meets the demands of the connection request is also not deposited in the dynamic connecting path memory, a suitable alternative path is determined on the basis of the stored network topologies and is entered into the dynamic connecting path memory. This connecting path is subsequently employed for the connection setup.

The dynamic connecting path memory can comprise a predetermined, maximum plurality of destination node-specific memory locations. When a new connecting path is to be entered in the dynamic connecting path memory and when all memory locations are already occupied, the connecting path situated longest in the dynamic connecting path memory can, for example, be overwritten. It is likewise possible to overwrite the connecting path that is employed least often. When a connecting path stored in the dynamic connecting path memory is eliminated or, respectively, when this becomes invalid, for example because sub-paths or network nodes that are employed are down, the corresponding connecting path is removed from the dynamic path memory, i.e. erased.

The maximum plurality n of memory locations of the dynamic connecting path memory can be permanently prescribed or can be, adjustable. It is advantageous to acquire the plurality of "overflows" per defined time unit of the dynamic connecting path memory and to increase the maximum plurality of memory locations of the dynamic connecting path memory dependent thereon. After expiration of a specific time span, the maximum plurality of available memory locations can in turn be reset after an incrementation, using a timer control.

A self-optimizing connecting path table is established in the corresponding network node, i.e. the corresponding switching equipment, of the communication network as a result of the inventively proposed employment of a dynamic path memory. It is assured in this way that the memory resources are protected against connecting paths that are only rarely or never employed. Further, it is only necessary to calculate a few or, respectively, absolutely no precalculated, standard connecting paths. The connection setup times are shortened on average due to the employment of the dynamic connecting path memory since, as a result of the dynamic connecting path memory, the probability increases substantially that a connecting path that is already suitable is available for an incoming connection request.

The present invention can be applied both to broadband networks as well as to narrowband networks and is independent of the communication standard respectively employed for the data transmission.

The invention is described in greater detail below on the basis of preferred exemplary embodiments with reference to the attached drawing.

BRIEF DESCRIPTION OF THE DRAWINGS

FIG. 1 is a schematic block circuit diagram of the structure of a first exemplary embodiment of the switching equipment of the invention.

BRIEF DESCRIPTION OF THE PREFERRED EMBODIMENTS

Figure 3:
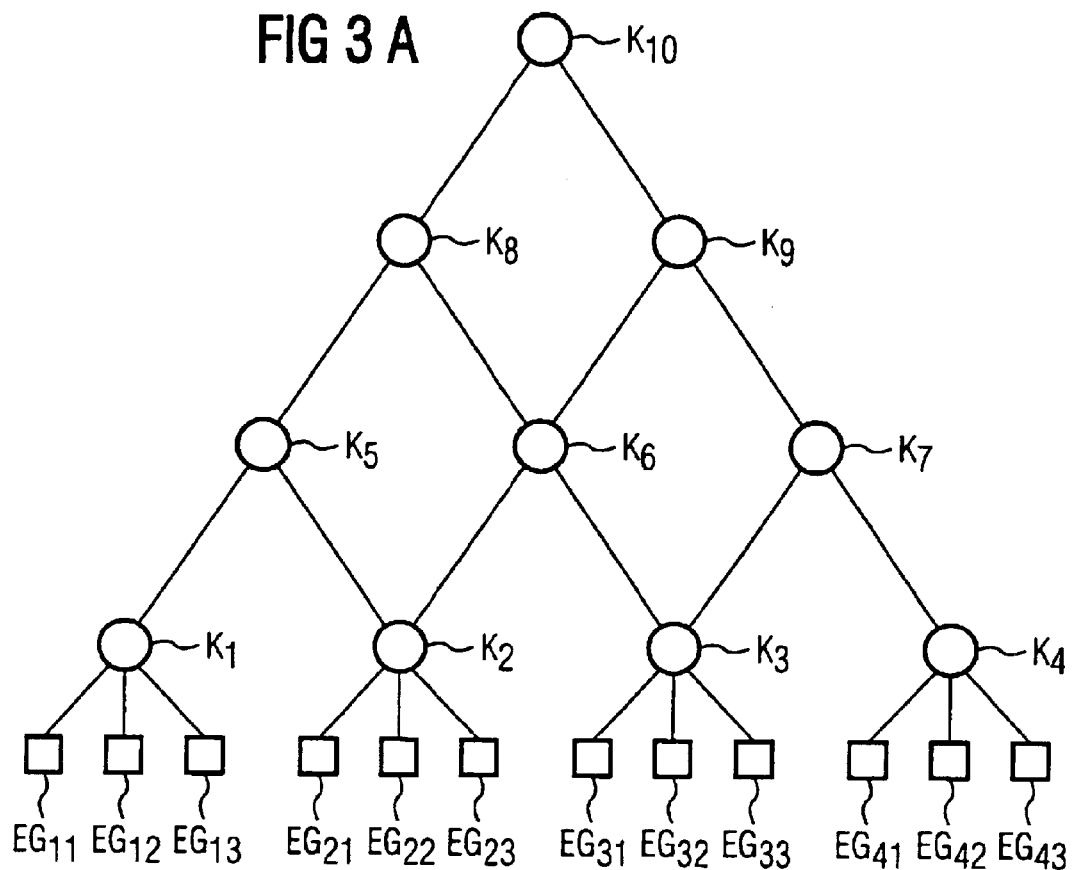
Figure 3:
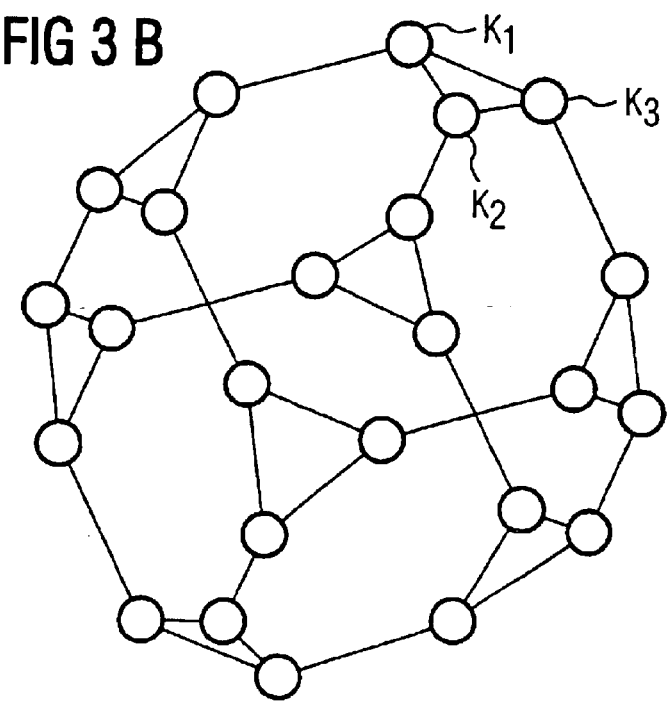

FIG. 1 shows a switching equipment 1 that is a component part of every network node of a communication network that, for example, can be structured as in FIG. 3a or 3b. The switching equipment 1 comprises a plurality of line units 2 that are respectively connected to a subscriber terminal equipment or to another switching equipment of another network node. The line units 2 convert the incoming information into digital data words to be internally processed. Further, the switching equipment 1 comprises a switching device 3 that serves the purpose of producing a physical connection between the individual line units 2 of the switching equipment for the transmission of data between the paths connected to the corresponding line units 2. The switching device 3 comprises a plurality of individual switching elements that form a switching network. The switching device 3 is the actual switching location of the switching equipment 1. Further, the switching equipment 1 comprises a control unit 4 designed, for example, in the form of a microprocessor that forms the heart of the switching equipment 1 and serves for the drive and monitoring of the individual line units 2 as well as of the switching device 3. Among other things, the control unit 4 sees to the synchronization of the individual line units 2 to the internal clock of the switching equipment 1 and for defining the physical connections between the individual line units 2 that are to be realized by the switching device 3; The control unit 4 thus determines via which path or, respectively, via which line unit 2 the communication data received via a different line unit 2 are to be forwarded or, respectively, output.

Further, the switching equipment 1 shown in FIG. 1 comprises a memory 7 in which the data of the network topology of the corresponding communication network are comprehensively stored. Particularly stored in this memory 7 are how many and which other network nodes the communication network comprises, which connecting lines or, respectively, connecting paths exist between the individual network nodes and what transmission properties (such as for example, transmission capacities or transmission statuses) these transmission paths comprise, etc.

The pre-calculated, standard connecting paths to the individual, potential destination nodes of the communication network that have already been explained above are stored in a further memory 6. As has already been explained, it is known from the Prior Art to pre-calculate specific, standard connecting paths to the individual, potential destination nodes of the communication network, whereby these standard connecting paths can, for example, respectively represent the shortest connecting path from the switching equipment 1 to another potential destination node of the communication network. Specific, standard connecting paths as well as the corresponding connection parameters or, respectively, connection properties (such as, for example, transmission capacity or transmission status) are thus stored in the memory 6 in destination node-specific fashion. However, it is not absolutely necessary to store the connection parameters for every connecting path in the memory 6 since, in principle, these information are already deposited in the memory 7. In order, however, to keep the connection setup times as short as possible, it is advantageous to deposit the corresponding connection parameters or, respectively, connection properties at the same time for each connecting path deposited in the memory 6. It is assumed in the exemplary embodiment shown in FIG. 1, that, in addition to comprising the switching equipment 1, the corresponding communication network comprises a further N, other switching equipment that serve as potential destination nodes for a communication connection with the switching equipment 1. One or more standard connecting paths can be stored for each potential destination node.

The switching equipment 1 also comprises a further memory 5 that serves as dynamic connecting path memory. The memory 5 is initially empty at the initial commissioning of the switching equipment 1.

The function of the switching equipment shown in FIG. 1 or, respectively, the control unit 4 thereof is as follows.

When a connection inquiry or, respectively, a connection request is received via one of the line units 2, the control unit 4 must first determine a suitable connecting path to the requested destination node before the setup of the corresponding connection, whereby, in particular, the connecting path must do justice to quality demands made of the requested connection (for example, bandwidth, transmission rate, etc.) that are potentially prescribed in user-specific fashion. To this end, the control unit 4 initially searches the standard connecting paths to the desired destination node that are stored in the memory 6. On the basis of the connection properties of the corresponding, standard connecting paths to the requested destination node that are likewise deposited in the memory 6, the control unit 4 can determine whether the memory 6 comprises a connecting path to the requested destination node that is suited for the requested connection properties. When this is the case, the corresponding connecting path is read out from the memory 6 and employed for the connection setup. When, however, the control unit 4 has not found a suitable connecting path to the requested destination node in the memory 6, the control unit 4 (with reference to the network topology data stored in the network topology memory 7) determines a suitable connecting path to the requested destination node that, in particular, meets the quality demands of the connection request.

Subsequently, this alternative path determined by the control unit 4 is entered in the dynamic connecting path memory 5. The entry occurs destination node-specifically and can, as shown in FIG. 1, also comprise the connection parameters or, respectively, transmission properties of the corresponding, identified connecting path. The entries in the dynamic memory 5 thereby occur in the sequence of the determination of the corresponding connecting paths by the control unit 4. Advantageously, the determined connecting paths are therefore stored in the memory 5 in the form of an FIFO stack. As can be derived from FIG. 1, the dynamic memory 5 is not limited to one entry per potential destination node; rather, a plurality of connecting paths (potentially with different transmission properties) can be entered fr each destination node. After entry of a connecting path in the memory 5, the corresponding connecting path determined by the control unit 4 is employed for the connection setup to the requested destination node. The entries in the memory 5 also remain stored in the memory 5 beyond the connection duration of the respectively corresponding connecting path.

When further connection requests are subsequently received at the switching equipment 1, the control unit 4 searches not only the pre-calculated, standard connecting paths to the requested destination node that are stored in the memory 1 but also searches the entries deposited in the dynamic memory 5. Only when suitable connecting paths to the requested destination node are found neither in the memory 6 nor in the dynamic memory 5 does the control unit 4 again determine a suitable connecting path on the basis of the network topology data stored in the memory 6 and subsequently enter this in the memory 5.

The scope of the memory 5 can be either permanently prescribed or variable. Before entry of a newly determined connecting path into the memory 5, the control unit 4 regularly monitors the memory occupation of the memory 5. When a newly determined connecting path is to be entered into the memory 5 even though a maximum plurality n of memory locations is already occupied, the control unit according to the first exemplary embodiment shown in FIG. 1 overwrites the connecting path that has been stored longest in the memory 5. When a connecting path has become invalid in the interim, for example because sub-paths or network nodes that are used have failed, this connecting path is potentially removed both from the memory 6 as well as from the memory 5.

The connection setup times can be shortened on average by employing the dynamic memory 5, since the probability increases substantially that a suitable connecting path is available either in the memory 6 or in the memory 5. In particular, the memory 5 contains only entries of connecting paths that have already met certain quality demands of a corresponding connection request. The entries of the memory 5 are this higher in quality compared to the entries of the memory 6 and therefore contribute to the shortening of the connection setup times since they clearly enhance the probability of finding a suitable connecting path.

After the control unit 4 of the switching equipment 1—as described above—has determined a suitable connecting path to the requested destination node, the control unit 4 generates the aforementioned information element in which the individual network nodes of the communication network that are to be traversed according to the determined connecting path are deposited. This information element is communicated from the control unit 4 via a corresponding line unit 2 to the first network node of this connecting path and comprises a pointer that always points to the next network node to be approached in the communication network. The network node of the communication network that is approached first thus forwards the pointer to a network node after reception of this information element.

Of course, the switching equipment 1 shown in FIG. 1 can also be employed without the memory 6 with the pre-calculated and stored, standard connecting paths to the individual, potential destination nodes of the communication network. In this case, the control unit 4 searches only the entries of the memory 5 upon arrival of a connection inquiry and determines a suitable connecting path on the basis of the network topology data stored in the memory 7 if the memory 5 has no suitable connecting path entries. Subsequently, the newly determined connecting path is deposited in the memory 5 and is then available for the determination of a new connecting path.

It has already been explained with reference to the memory 6 that the storing of the connection parameters of the corresponding connecting path in the memory 6 is optional. This also applies to the entries in the memory 5. With respect to the memory 5, too, it is fundamentally adequate when only the determined connecting path to the corresponding destination node is stored, since the transmission properties or, respectively, connection parameters corresponding to the connecting path are stored in the memory 7. The storing of the connection parameters together with the corresponding connecting path in the memory 5, however, is advantageous since the control unit 4 need not additionally access the entries in the memory 7 subsequently in the determination of a new connecting path in order to identify the corresponding transmission properties of the respective connecting path.

Figure 2:
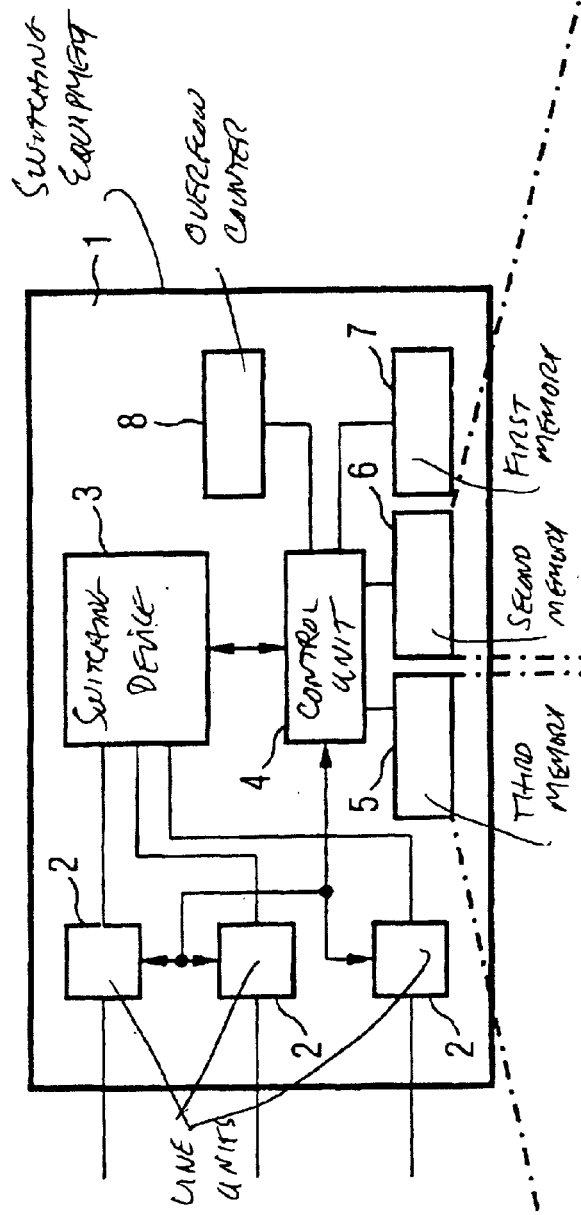
FIG. 2 is a schematic block circuit diagram of the structure of a second exemplary embodiment of the switching equipment of invention and FIGS. 3a and 3b show exemplary communication network structures.

FIG. 2 shows a second exemplary embodiment of the inventive switching equipment.

The switching equipment 1 shown in FIG. 2 as well as the function thereof essentially corresponds to the switching equipment shown in FIG. 1. According to the second exemplary embodiment, however, the switching equipment 1 also comprises an overflow counter 8. This overflow counter 8 acquires the plurality of overflows of the dynamic connecting path memory 5. I.e., the counter reading of the overflow counter 8 is always incremented by 1 when the control unit 4 wishes to enter a new connecting path in the memory 5 even though a number of connecting paths corresponding to the predetermined maximum plurality n is already stored. The control unit can determine the number of "overflows" of the memory 5 during a defined time span on the basis of the counter reading of the overflow counter 8 and can correspondingly adapt the memory scope of the memory 5 dependent thereon, i.e. raise or lower the maximum plurality n of the entries of the memory 5. When the maximum plurality n of entries of the memory 5 was raised or lowered, the control unit 4 in a version of the second exemplary embodiment shown in FIG. 2 can in turn reset the maximum memory scope n of the memory 5 to the original value after the expiration of a corresponding time span.

Another characteristic of the exemplary embodiment shown in FIG. 2 is the fact that, in addition to the data shown in FIG. 1, the control unit 4 also stores the frequency of use of each connecting path deposited in the memory 5. This means that, given employment of a connecting path stored in the memory 5, the control unit likewise increments the counter of this connecting path stored in the memory 5 by 1. This version makes it possible for the control unit 4 to overwrite the least frequently employed connecting path of the memory 5 with a newly determined connecting path when the maximum plurality n of memory locations of the memory 5 is already occupied.

Particularly as a result of monitoring the frequency of use of each connecting path deposited in the memory 5, the memory 5 forms a self-optimizing connecting path table. The quality of the entries of the memory 5 increases with the operating duration of the switching equipment 1 or, respectively, with the plurality of connections requests arriving at the switching equipment. This self-optimizing connecting path table assures that connecting paths that are only used seldom or not at all do not remain stored in the dynamic memory 5 over a longer time.

By employing the dynamic memory 5, i.e. a memory whose content dynamically changes with the operating duration of the switching equipment, only a few or, respectively, potentially absolutely no standard connecting paths need be calculated in advance and stored (in the memory 6).

Although various minor changes and modifications might be proposed by those skilled in the art, it will be understood that my wish is to include within the claims of the patent warranted hereon all such changes and modifications as reasonably come within my contribution to the art.

What is claimed is:

1. A method for determining a connection path for a connection request in a communication network, comprising:
    determining whether a connection path to a destination node of the communication network is stored in a second memory, wherein determining comprises determining whether the connection path conforms to transmission requirements of the connection request;
    if the connection path is not stored in the second memory, determining the connection path based on network data stored in a first memory, the network data describing the communication network;
    storing the connection path in the second memory; and
    communicating path information corresponding to the connection path to network nodes that are part of the connection path in order to set up the connection path,
    wherein determining the connection path comprises determining whether the connection path to the destination node conforms to the transmission requirements of the connection request.

2. A method according to claim 1, wherein the transmission requirements include one of a bandwidth requirement and a transmission rate requirement.

3. The method according to claim 1, further comprising: storing, in the second memory, a plurality of standard connection paths to network nodes of the communication network.

4. The method according to claim 1, wherein a limited number of connection paths are stored in the second memory.

5. The method according to claim 4, further comprising: erasing a connection path stored longest in the second memory, when the limited number of connection paths are stored in the second memory and the connection path is to be stored in the second memory.

6. The method according to claim 4, further comprising: erasing, from the second memory, a connection path used least when the limited number of connection paths are stored in the second memory and the connection path is to be stored in the second memory.

7. The method according to claim 4, wherein the limited number is variable.

8. The method according to claim 7, further comprising: counting overflow cases, wherein an overflow case comprises a case where a connection path cannot be stored because of a lack of available memory storage; and
    setting the limited number based on the number of overflow cases.

9. The method according to claim 7, further comprising:
    raising the limited number for a specified period of time; and
    resetting the limited number after the specified period of time.

10. The method according to claim 1 further comprising:
    using a control unit in switching equipment to form a network node of the communication network.

11. Switching equipment for determining a connection path for a connection request in a communication network, comprising:
    a plurality of line units connected to terminal equipment or to other switching equipment;
    a first memory for storing network data that describe the communication network;
    a second memory for storing connection paths that connect the switching equipment to destination switching equipment on the communication network; and
    a control unit that receives the connection request via one of the line units for a connection to destination switching equipment and searches the second memory for a connection path to the destination switching equipment and, if a connection path is not found in the second memory, determines a connection path to the destination switching equipment based on the network data stored in the first memory and stores the connection path in the second memory, wherein determining the connection path comprises determining whether the connection path to the destination node conforms to transmission requirements of the connection request;
    wherein the control unit, after finding the connection path in the second memory or determining the connection path based on the network data stored in the first memory, communicates information corresponding to the connection path via a corresponding line unit to further switching equipment that is part of the connection path in order to set up the connection path.

12. The switching equipment according to claim 11, further comprising:
    a third memory for storing a plurality of connection paths to destination switching equipment,
    wherein the control unit searches the third memory and the second memory for a connection path to the destination switching equipment.

13. The switching equipment according to claim 11, wherein the control unit monitors the connection paths stored in the second memory to restrict the connection paths to a limited number of connection paths.

14. The switching equipment according to claim 13, wherein the control unit erases a connection path stored longest in the second memory when the limited number of connection paths are stored in the second memory and the connection path is to be stored in the second memory.

15. The switching equipment according to claim 13, further comprising:
    a counting unit for counting a number of times a connection path stored in the second memory is used for a connection setup to the destination switching equipment,
    wherein the control unit erases a connection path that is used least when the limited number of connection paths are stored in the second memory and the connection path is to be stored in the second memory.

16. The switching equipment according to claim 13, further comprising a counting unit for counting a number of overflow cases in the second memory and for setting the limited number based on the number of overflow cases, wherein an overflow case comprises a case where a connection path cannot be stored because of a lack of available memory storage.

17. The switching equipment according to claim 13 wherein the control unit increases the limited number of connection paths stored in the second memory based on the number of overflow cases.

18. The method of claim 1, wherein transmission requirements are user selected.

19. The switching equipment of claim 11, wherein transmission requirements include one of a bandwidth requirement and a transmission rate requirement.

20. The switching equipment of claim 1, wherein transmission requirements are user selected.

* * * * *